United States Patent [19]
Hooper

[11] Patent Number: 5,512,315
[45] Date of Patent: Apr. 30, 1996

[54] CAPACITOR MANUFACTURING TECHNIQUE

[75] Inventor: Geoffrey K. Hooper, Statesville, N.C.

[73] Assignee: Roederstein Electronics, Inc., Statesville, N.C.

[21] Appl. No.: 251,907

[22] Filed: Jun. 1, 1994

[51] Int. Cl.[6] ................................................ B05D 1/32
[52] U.S. Cl. ........................... 427/79; 427/154; 427/156; 427/259; 427/272; 427/300; 29/25.42; 361/301.5
[58] Field of Search ........................... 427/79, 154, 155, 427/156, 259, 272, 300, 421; 118/56, 57, 301; 29/25.42; 361/328, 301.5; 264/272.18

[56] References Cited

U.S. PATENT DOCUMENTS

| | | | |
|---|---|---|---|
| 3,891,901 | 6/1975 | Booe et al. | 317/258 |
| 3,892,023 | 7/1975 | Warmont | 29/25.42 |
| 4,027,054 | 5/1977 | Porod | 427/79 |
| 4,115,600 | 9/1978 | Schroeder et al. | 427/79 |
| 4,478,878 | 10/1984 | Neuwald | 427/79 |
| 4,548,967 | 10/1985 | Brown et al. | 524/56 |
| 4,633,368 | 12/1986 | Frederick . | |
| 5,157,820 | 10/1992 | Frederick | 29/25.42 |
| 5,186,978 | 2/1993 | Woodhall et al. | 427/154 |

Primary Examiner—Shrive Beck
Assistant Examiner—Brian K. Talbot
Attorney, Agent, or Firm—Alfred Stapler; Lipton & Stapler

[57] ABSTRACT

Sacrificial coatings are applied to the rounded ends of the flattened spiral laminates for wound film capacitors. The coated laminates are positioned between tapes masking their flat surfaces. The end faces of those laminates are then sprayed with the schoopage metal and the laminates are subsequently tumbled to remove the coatings and any overspray appearing on their rounded surfaces.

10 Claims, 3 Drawing Sheets

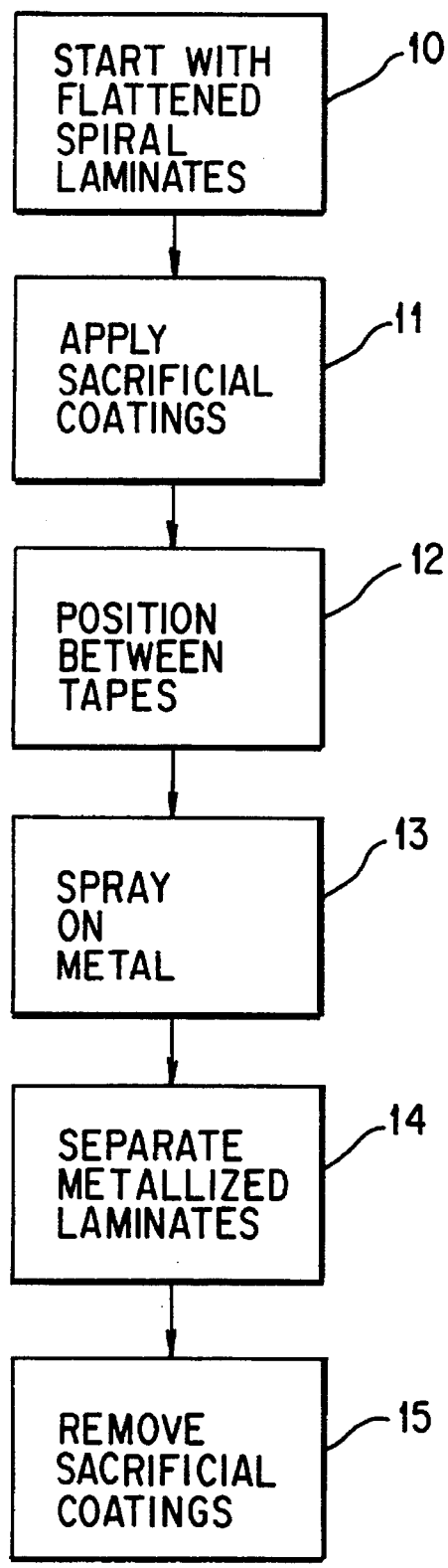
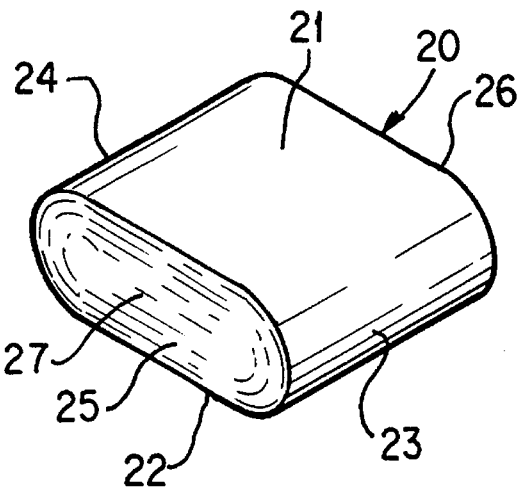
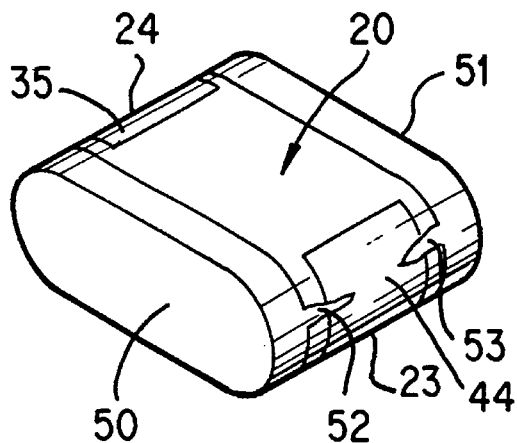

CAPACITOR MANUFACTURING TECHNIQUE

BACKGROUND OF THE INVENTION

This invention relates to manufacturing techniques for so called "wound film capacitors".

This type of capacitor is well-known and is routinely manufactured in large quantities. In these capacitors, the plates consist of thin metal films or foils, separated by a plastic film dielectric. The capacitors are referred to as "wound" because the metal-dielectric-metal sandwich is wound into a spiral laminate, thereby providing high values of capacitance in a relatively compact format.

For subsequent use, the spiral, which is initially round in its cross-section, is flattened to give it a race track-like cross-section. Connecting leads are then attached to the opposite capacitor plates as follows. The metal layers forming the capacitor plates are so positioned that one plate extends all the way out, or even slightly beyond one end face of the flattened spiral laminate, while the other plate extends to or slightly beyond the opposite end face. Metal, sometimes referred to as "schoopage" metal, is then applied to each end face of the laminate by spraying it on (in molten form), thereby making contact with all the turns of one capacitor plate at one of the end faces and with all the turns of the other capacitor plate at the opposite end face of the spiral laminate. Subsequently, wire connecting leads are welded to these sprayed-on metal contacts.

The resulting assembly is encapsulated, with the connecting wires protruding for connection to other electronic circuit components.

A conventional technique for carrying out the manufacturing operations for wound-film capacitors, including the specific steps outlined above, is by means of high-speed, semi-automated machinery.

For the spraying-on of the schoopage metal, there is formed a continuous web consisting of two paper tapes, between which are positioned, in a row, the individual flattened metal-and-dielectric spiral laminates. These are oriented so that the flat surfaces of the spiral are in contact with the respective tapes, while the rounded ends of adjacent units are positioned facing each other in the longitudinal direction of the tapes. The end faces of the spirals are adjacent to the side edges of the tapes. Between any two consecutive spirals, the tapes are pinched together, thereby effectively forming spaced-apart sleeves in which the consecutive laminates are held. Thus, there is formed a configuration which, in its geometry, can be roughly analogized to an ammunition belt, with the individual laminates corresponding to the bullets in the belt.

The web which is formed in this way is then subjected to metal spray from opposite sides of the web. The intention is to have this sprayed-on metal reach only the end faces of the laminates in order to form the desired electrical contacts to the respective capacitor plates exposed at these end faces. In doing so, the tapes are intended to serve as masking means, for keeping the metal spray confined to these end faces. However, the previously described configuration of laminate-holding sleeves, spaced apart by the pinched-together portions of the paper tapes, leaves roughly triangular gaps between these tapes, adjacent to the rounded ends of the spiral laminates. This, in turn, permits sprayed-on metal to also unintentionally reach and become deposited on the above-mentioned rounded ends of the laminates. The material so deposited is sometimes referred to as "overspray".

This is a highly undesirable phenomenon, because the presence of such overspray can adversely affect the quality of the capacitor. In some cases, the metal overspray can actually provide a complete metal path between opposite end faces of the laminate, thereby in effect bridging the capacitor plates and shorting-out the capacitor completely. Even if this metal bridging path is not complete, it can still substantially reduce the internal resistance of the capacitor, which may render it ineffective for its intended purpose.

Consideration has been given to applying a material, such as Teflon, to the surface of the laminates, in order to prevent the metal overspray from sticking to this surface, but this has not proven to be effective.

SUMMARY OF THE INVENTION

Accordingly, it is an object of the invention to utilize a manufacturing technique for wound film capacitors which lessens one or more of the drawbacks of the prior art.

It is another object to provide such a technique which reduces the ill effects of metal overspray.

It is still another object to reduce these ill effects in a manner which is compatible with high-speed semi-automated capacitor manufacture.

These and other objects of the invention which will appear are achieved as follows.

Before placing the individual, flattened laminates between the paper tapes, for subsequent exposure to the metal spray, each of these laminates has applied to its surface a coating of a material which is subsequently removed, without damage to the laminates. Specifically, this coating is applied to those portions of the laminates' surface which, when the laminates are subsequently held between the tapes, will be located in the above-mentioned triangular gaps created by the pinching of the tapes between consecutive laminates. These portions, to which the coating is applied, are the rounded end portions of the flattened laminates.

The so-coated laminates are then inserted between the paper tapes in conventional manner and are subjected to the schoopage metal spray, also in conventional manner. No special attempt is made to prevent overspray during this operation. Rather, the spraying is conducted without regard to whether it causes overspray or not. At a later stage in the production process, namely at the stage at which the individual laminates have been separated from the paper tapes, these laminates are tumbled in order to smooth and deburr the sprayed-on metal. This tumbling action also removes the previously applied coating, which simply comes loose from the laminates themselves, and takes with it any overspray deposited on top of this coating.

Because this coating serves no purpose other than to provide a removable substrate for the overspray, it is referred to herein as a "sacrificial" coating.

As a result, after such tumbling, the metal overspray is no longer present on the individual laminates and therefore poses no danger to their quality.

For further details, reference is made to the description which follows in light of the accompanying drawings.

BRIEF DESCRIPTION OF THE DRAWINGS

FIG. 1 is a flow diagram, showing the steps or stages which characterize the technique embodying the invention.

FIG. 2 is a simplified and enlarged perspective view of the spiral laminate for a wound film capacitor, at the initial stage of the flow diagram of FIG. 1.

FIG. 5 shows, still in highly diagrammatic form, the laminate, after having had capacitor-plate contacting metal sprayed on.

The same reference numerals designate corresponding elements in the several Figures.

DETAILED DESCRIPTION OF THE DRAWINGS

Figure 3:
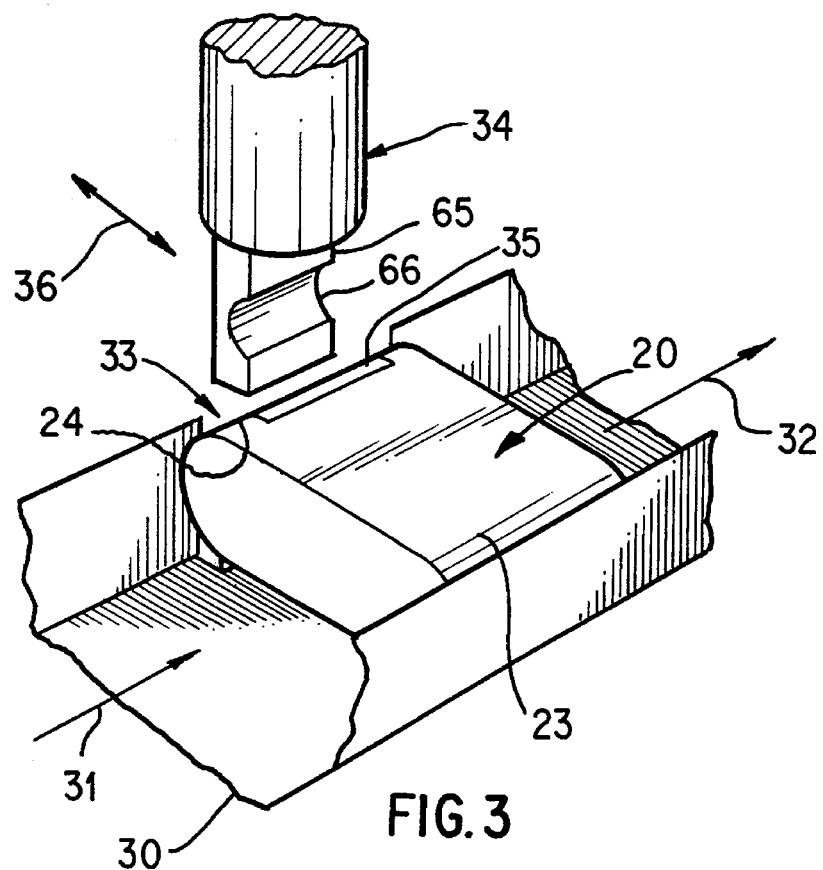
FIG. 3 shows in highly diagrammatic form the apparatus for applying sacrificial coating to the laminate of FIG. 2.

Referring to FIG. 1, this shows, by means of block 10, that the technique embodying the invention starts at the stage in the capacitor manufacturing process at which the conventional flattened spiral laminates have already been produced.

Such a laminate 20 is shown in FIG. 2. It has generally flat surfaces 21 and 22 (the latter not visible in FIG. 2), rounded surfaces 23 and 24, and end faces 25 and 26 (the latter also not visible). The striations 27 within end face 25 are intended to symbolize the many turns of metal and dielectric films which make up the laminate 20.

Referring again to FIG. 1, block 11 shows that the preexisting laminates next have sacrificial coatings applied to them in those regions in which the possibility exists that overspray may occur during the subsequent metallization of their end faces.

Apparatus for performing such coating application is shown in FIG. 3. A laminate 20 is shown there, adapted to move in the direction of arrows 31, 32 along a channel 30. In channel 30, of which only a fragment is shown in FIG. 3, there is provided a gap 33; outside that gap there is positioned a coating applicator 34. When laminate 20 reaches gap 33, it stops momentarily, the coating applicator moves into contact with the curved surface 24 of laminate 20 and deposits on it the coating 35. The applicator 34 then moves away from contact with laminate 20, leaving coating 35 behind. This reciprocating movement of applicator 34 is represented by the two-headed arrow 36 in FIG. 3. Although not shown in the drawing, a corresponding gap and coating apparatus is provided further downstream along channel 30 and on the side of that channel opposite gap 33, for coating the opposite curved surface (23 in FIG. 2) of laminate 20.

Referring again to FIG. 1, block 12 shows that the laminates, with both rounded surfaces now coated, are next positioned in sleeves formed by paper tapes.

Figure 4:
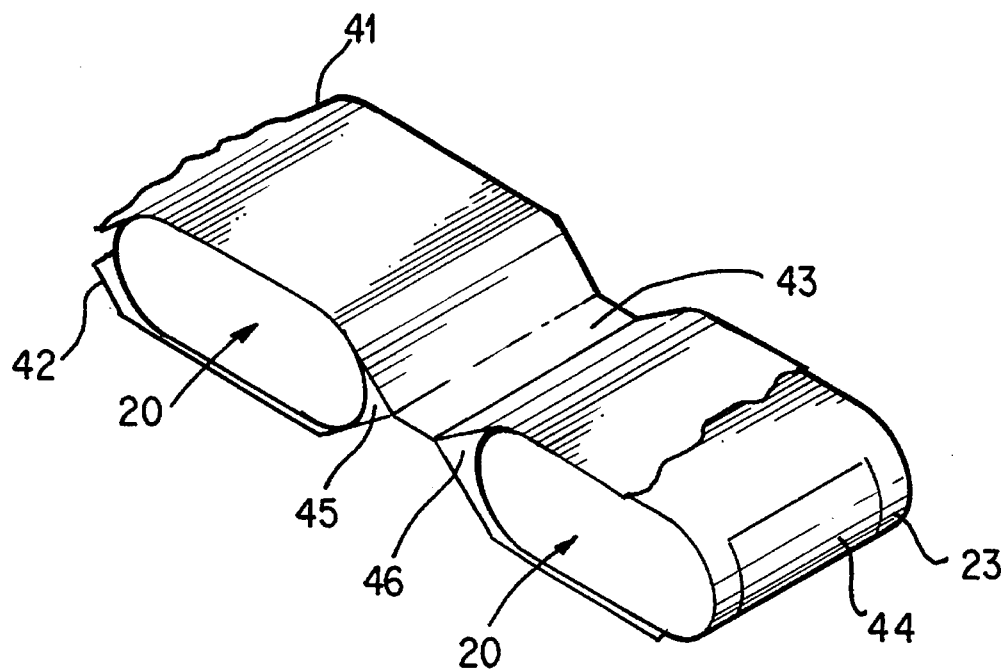
FIG. 4 shows, also in highly diagrammatic form, the laminate, coated per FIG. 3, positioned in sleeves formed between masking tapes.

This condition is illustrated in FIG. 4, where two laminates 20 are shown positioned between upper and lower tapes 41, 42. In order to hold the laminates in their respective positions between tapes 41, 42, these tapes 41, 42 are pinched together in the regions between consecutive laminates, as shown at 43 in FIG. 4. Also in FIG. 4, tape 41 is shown broken away above one laminate 20, so as to reveal the sacrificial coating 44 which, in accordance with the present invention, had previously been applied on the rounded surface 23 of that laminate 20.

Referring again to FIG. 1, block 13 represents the stage at which metal is sprayed onto the end faces of the laminates (end faces 25, 26 in FIG. 2). This metallization is carried out while the laminates are still positioned between tapes 41, 42 (FIG. 4).

In this manufacturing process, no attempt is made to direct the metal spray precisely at the end faces of individual laminates. To the contrary, the spray is directed at groups of laminates in a broad-brush fashion. Therefore, some of that spray will inevitably penetrate into the roughly triangular gaps 45, 46 shown in FIG. 4, which are formed between each rounded surface of a laminate 20 and the adjacent pinched portion 43 between consecutive laminates.

As shown in FIG. 5, this results in laminates 20 which not only have the desired metallization 50, 51 applied to their end faces, but some of this metal now extends onto their rounded surfaces 23, 24. These metal extensions are diagrammatically illustrated by irregular projections 52, 53 in FIG. 5. They constitute the unwanted overspray.

In accordance with the present invention, this overspray (52, 53 in FIG. 5) has now not been deposited directly on the rounded surfaces 23, 24 of the laminate 20. Rather the overspray is separated from those laminate surfaces by the previously applied sacrificial coatings 35, 44.

Referring again to FIG. 1, block 14 shows that, following the metallizing operation which resulted in laminates 20 with metallization 50, 51 and overspray extensions 52, 53, as shown in FIG. 5, these laminates are removed from their positions between tapes 41, 42.

Block 15 (FIG. 1) shows the final stage of the technique embodying the present invention, which involves tumbling the separated laminates so as to cause, through contact abrasion between them, the removal of their sacrificial coatings and, with this, the removal of the metal overspray.

Figure 6:
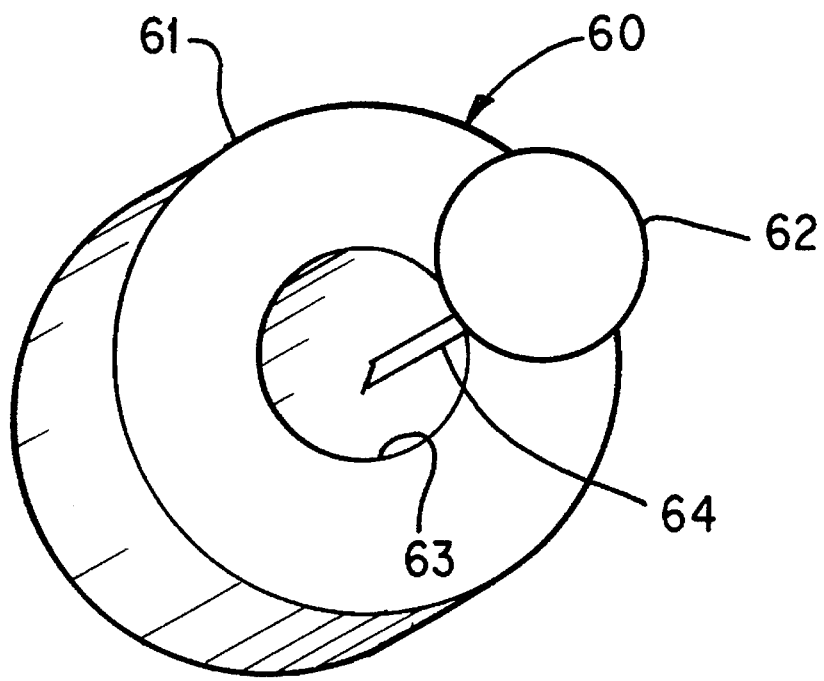
FIG. 6 shows, again in highly diagrammatic form, the apparatus for removing the sacrificial coatings and with them any overspray.

FIG. 6 shows the tumbling apparatus 60, which is a motor-driven rotatable basket 61. A door 62 is adapted to close the access opening 63. The whole basket is preferably perforated, e.g. made of perforated metal. Its axis of rotation is preferably tilted upwardly toward opening 63 at an acute angle. Vanes, such as shown at 64 in FIG. 6 are provided inside the basket, to promote tumbling.

Figure 7:
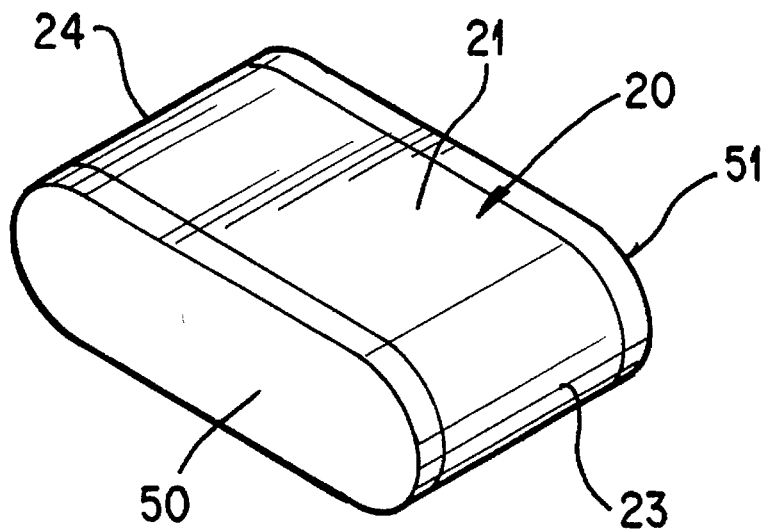
FIG. 7 is a simplified and enlarged perspective view of the metallized spiral laminate at the final stage of the flow diagram of FIG. 1.

Batches of the laminates 20 (FIG. 5), with metallization, sacrificial coating and overspray, are introduced into basket 61 and tumbled inside through rotation of the basket. There takes place abrasion, by contact, of the sacrificial coatings 35, 44 and any overspray present upon these coatings. The debris resulting from the abrasion through tumbling action are small particles of metal and sacrificial coating, which drop from the basket 61 through its perforations, leaving the finished laminates behind. One of these finished laminates is shown in FIG. 7.

Referring again to the application of sacrificial coatings to the initial laminate (block 11 in FIG. 1 and all of FIG. 3), channel 30 is the discharge channel of a conventional vibrator hopper, which contains a quantity of these laminates 20 and from which they emerge in succession onto channel 30, moving in the direction of arrows 31 and 32 (FIG. 3) along that channel. Being entirely conventional, the vibrator hopper is not shown in the drawings.

For simplicity of illustration there is shown in FIG. 3 only one laminate 20 in channel 30. However, it will be understood that the vibrator hopper delivers into channel 30 a continuous stream of such laminates which advance in the direction or arrows 31, 32 by pushing each other in that direction.

When that laminate which leads that stream at any given time, reaches the location at which it will be placed between tapes 41, 42, it butts up against a stop member (not shown), thereby stopping not only its own advance, but also that of the laminates following behind it in channel 30.

The locations of the gaps in that channel, in which the sacrificial coatings 35, 44 are applied (e.g. gap 33 in FIG. 3) are so chosen that laminates are present at those gaps at the time of such stopping.

The movements of the coating applicators (e.g. applicator 34 in FIG. 3) are timed in relation to these stoppages so that the applicators also perform their respective applying motions during such stoppages.

More specifically, a solenoid (not shown) is then actuated to cause the reciprocating motion of applicator 34, shown by arrow 36, first into contact with the rounded surface 24 and then back out of such contact thereby producing coating 35.

At the same time, a laminate downstream from gap 33 is being contacted by an applicator from the opposite side of channel 30 to form the coating 44 on that downstream laminate. Thus, coatings on both rounded laminate surfaces are progressively formed.

Each stoppage is lifted by removing the above-mentioned leading laminate (which caused the stoppage) from its position abutting the stop member, as described below. This permits the next laminate to assume the same abutting position and enables the stream of laminates to advance by one unit along channel 30.

Each applicator (e.g. 34 in FIG. 3) is preferably in the form of a felt-tipped pen containing black ink. Such a pen which has been found suitable in practice is identified as PaperMate Permanent Marker—Model W10. Before using this felt-tipped pen as an applicator, there is carved into its felt tip (e.g. 65 in FIG. 3) a curved recess (e.g. 66 in FIG. 3) shaped to conform to the desired configuration of the sacrificial coating (e.g. 35 in FIG. 3) which is to be created by the applicator.

The channel 30 discharges each lead laminate 20 into the space between two tapes (41, 42 in FIG. 4) which are being unrolled from spools. Slightly downstream from the discharge point of each laminate 20, the two tapes, which are coated on their facing sides with self-adhesive material, are pressed together to form the pinched region 43 of FIG. 4.

A pushrod (not shown) is used to push each laminate 20 into the converging space defined by these two tapes and the pinched region 43. That is what removes the successive leading laminates from their stoppage-causing location and permits the laminate stream in channel 30 to advance by one unit at a time, as previously mentioned.

The advance of the tapes is so coordinated with the discharge rate of the laminates 20 that there is produced an assembly of consecutive laminates positioned between tapes 41 and 42 and separated by pinched regions 43. As shown in FIG. 4, the tapes 41 and 42 are preferably slightly wider than the laminates. This forms, in effect, shallow cups whose bottoms are defined by the end faces of the laminates and whose sides are formed by the projecting tapes.

The tape-and-laminate assembly so formed is then preferably wound up into a reel containing a multitude of the coated laminates 20, whose opposite end faces 25, 26 are exposed on opposite sides of the reel.

Metal spray is then applied to both sides of the reel. This is done, not by aiming the metal spray at each individual laminate, but in broad brush fashion, across the two exposed sides of the reel. The result is that, as intended, each of the shallow cups which are formed by an end face of a laminate and the protruding edges of the tapes 41 and 42 which mask its flat surfaces 21 and 22 becomes filled with metal. However, since the rounded surfaces of the laminates are not masked by tapes 41 and 42, the spray can also reach those rounded surfaces thereby forming the (unwanted) overspray.

The previously mentioned separation of the laminates 20 from their positions between tapes 41, 42, after having been sprayed with metal, is accomplished in conventional manner by simply pulling the tapes apart while unreeling the reel assembly. By so doing, the individual metal-sprayed laminates simply drop down from their positions between the tapes and are collected in a container positioned to catch them as they drop. They are then further processed in tumbling apparatus 60 (FIG. 6).

The self-adhesive material which holds tapes 41, 42 together in pinched regions 43 has insufficient adhesive strength to prevent such pulling apart.

It is emphasized that many of the operations and stages described herein predate the present invention. However, they interact with the invention to yield the new result of providing metallized laminates for wound film capacitors which are free of overspray, and do so in a simple and elegant manner, which leaves unchanged all but one of the previously performed operations, while utilizing these operations to obtain the new result.

The one operation which is structurally changed is that of transporting the initially formed laminates (FIG. 2) from the vibrator 18 hopper to their insertion between tapes 41, 42. As described previously with reference to FIG. 3, this now involves the apparatus for applying sacrificial coatings 35 and 44 to these laminates. Prior to this invention, such apparatus was not present; instead the laminates proceeded from the vibrator hopper to the tapes without being treated by such apparatus.

On the other hand, the positioning of the laminates between tapes (FIG. 4), their reeling up, their spraying with metal (FIG. 5) and their tumbling (FIG. 6), in themselves all predate the present invention. However, it is believed to be apparent that they all also contribute to the ultimate inventive result, as previously pointed out.

It will be understood that there are many modifications which will occur to those skilled in the art without departing from the inventive concept. For example, other techniques than described specifically with reference to FIG. 3 may be used to apply the sacrificial coatings to the laminates, e.g. by brushing these coatings on. Also the coating material may be different, for example, a preparation of butane, ethanol, and carbon black in the proportions of 95:4:1 by weight.

In case there is a jam-up of laminates in channel 30 (FIG. 3) which interrupts the continuous stream of laminates, a photocell may be positioned above the channel, which alerts an operator to a gap in that stream and thereby enables remediation of the condition.

In view of all the foregoing, it is desired to limit the inventive concept only by the appended claims.

What is claimed is:

1. In a method of fabricating wound film capacitors, which method comprises the steps of positioning flattened spiral laminates between tapes which mask the flat surfaces but not the rounded surfaces or the end faces of said laminates, spraying metal onto said end faces in such manner that some of said metal may form overspray on said rounded surfaces, and tumbling the sprayed laminates to abrade surface roughness from said sprayed-on metal, the improvement comprising:

applying a sacrificial coating at least to portions of said rounded surfaces prior to positioning said laminates between said tapes, said tumbling also abrading said coatings and any overspray on said coatings.

2. The method of claim 1 further characterized in that said tapes are pinched together between laminates, thereby defining a three-sided gap between said tapes and the adjoining rounded surfaces of adjacent laminates, said sacrificial coating being applied at least to portions of said rounded surfaces facing said three-sided gap.

3. The method of claim 1 characterized in that said coating is made of a material which is readily abraded by said tumbling.

4. The method of claim 3 wherein said coating material is applied by contact with a felt-tipped pen.

5. The method of claim 4 wherein the pen has cut into its felt tip a curved notch which approximately matches the rounded laminate surface to which the coating is applied.

6. The method of claim 5 wherein the coating application is performed while said laminates are being transported in a channel leading from a reservoir of said laminates to the place of positioning said laminates between said tapes.

7. The method of claim 6 wherein the laminates are coated on each of their opposite rounded surfaces.

8. The method of claim 7 wherein said opposite surfaces are coated at different locations in said channel.

9. The method of claim 1, wherein said coatings are applied so as not to extend beyond the end faces of said laminates.

10. The method of claim 1, wherein said coatings are applied to the rounded surfaces of said laminates so as to cover at least the portion of said rounded surfaces located centrally between said end faces.

\* \* \* \* \*